United States Patent [19]
Bodin et al.

[11] Patent Number: 5,390,338
[45] Date of Patent: Feb. 14, 1995

[54] METHOD OF CONTROLLING OUTPUT POWER IN A MOBILE RADIO COMMUNICATION SYSTEM

[75] Inventors: Stig R. Bodin, Spanga; Karl R. V. Forsselius, Bromma, both of Sweden

[73] Assignee: Telefonaktiebolaget L M Ericsson, Stockholm, Sweden

[21] Appl. No.: 225,940

[22] Filed: Apr. 11, 1994

Related U.S. Application Data

[63] Continuation of Ser. No. 763,231, Sep. 20, 1991, abandoned.

[30] Foreign Application Priority Data

Oct. 5, 1990 [SE] Sweden ............................ 90031964

[51] Int. Cl.$^6$ .................. H04B 1/00; H04Q 7/00
[52] U.S. Cl. .................. 455/33.1; 455/54.1; 455/67.6; 455/69; 379/63
[58] Field of Search .............. 455/33.1, 54.1, 63, 455/67.6, 69, 126, 127; 379/59–60, 63

[56] References Cited

U.S. PATENT DOCUMENTS

| | | | |
|---|---|---|---|
| 3,732,496 | 5/1973 | Boyer | 455/69 |
| 4,495,648 | 1/1985 | Giger | 455/73 |
| 4,613,990 | 9/1986 | Halpern | 455/69 |
| 4,811,421 | 3/1989 | Havel et al. | 455/126 |
| 5,003,619 | 3/1991 | Morris et al. | 455/69 |
| 5,056,109 | 10/1991 | Gilhousen et al. | 455/33.1 |
| 5,129,098 | 7/1992 | McGirr et al. | 455/126 |
| 5,204,970 | 4/1993 | Stengal et al. | 455/126 |

FOREIGN PATENT DOCUMENTS

| | | |
|---|---|---|
| 0392078 | 10/1990 | European Pat. Off. . |
| 0392079 | 10/1990 | European Pat. Off. . |
| 2229609 | 9/1990 | United Kingdom . |
| WO86/00486 | 1/1986 | WIPO . |

*Primary Examiner*—Edward F. Urban
*Assistant Examiner*—Andrew Faile
*Attorney, Agent, or Firm*—Burns, Doane, Swecker & Mathis

[57] ABSTRACT

The invention relates to a method of controlling, in a cellular mobile radio communication system, the output power of radio signals transmitted from a transmitter to a receiver located in the same cell as the transmitter. The method comprises controlling the output power of the transmitter in dependence of a parameter, that is characteristic of the distance between transmitter and receiver, to approximately follow, from a predetermined maximum output power that is transmitted when the distance between the transmitter and receiver is the maximum within the cell, a first function that monotonically decreases with decreasing distance and approaches a predetermined minimum output power as the distance approaches zero, so that the power of the transmitted radio signals as received by the receiver from a minimum received power, that is received when the distance between transmitter and receiver is the maximum within the cell, approximately follows a second function that monotonically increases with decreasing distance and approaches a maximum received power as the distance approaches zero.

14 Claims, 3 Drawing Sheets

METHOD OF CONTROLLING OUTPUT POWER IN A MOBILE RADIO COMMUNICATION SYSTEM

This application is a continuation of application Ser. No. 07/763,231, filed Sep. 20, 1991, abandoned.

TECHNICAL FIELD

The present invention relates to a method for controlling, in a cellular mobile radio communication system, the output power of radio signals transmitted from a transmitter to a receiver that is located in the same cell as the transmitter.

PRIOR ART

A cellular mobile radio communication system comprises a number of cells, each containing a base station. These base stations communicate with mobile stations that can move freely within and between the cells. Since the number of available frequencies for the total system is limited, frequencies are reused for cells that are sufficiently separated from each other.

However, in such reuse of radio frequencies there is a risk that a radio connection is disturbed by signals intended for another radio connection using the same frequency. Thus, it is desirable to control the output power from, for instance, a mobile station in such a way that sufficient output power is transmitted to guarantee that the quality of the radio connection is maintained at the same time as the output power is limited so as to not unnecessarily disturb other radio connections that may use the same frequency.

In U.S. Pat. No. 4,485,486 it has been suggested to control the output power of the mobile station in such a way that the signal received by the base station has constant power irrespective of the distance between mobile station and base station. A drawback of this previously known method is that C/I, that is the ratio between the power received at the base station of the carrier transmitted by the mobile station and the power of interfering signals, on the average is lower than is actually permissible. This is due to the fact that the output power of the mobile station at small distances, where a further reduction of the output power from an already low level has a very small influence on the disturbance on other radio connections, is reduced to an extent uncalled for. On the other hand this further reduction can increase the risk of jeopardizing the mobile stations own radio connection.

SUMMARY OF THE INVENTION

An object of the present invention is to provide a method for controlling the output power from a mobile station and/or a base station in a cellular analog or digital mobile radio communication system in dependence of the distance between the base station and mobile station in such a way that the variation in transmitted power and received power is distributed in a more optimal way.

Accordingly the invention relates to a method of controlling, in a cellular mobile radio communication system, the output power of radio signals transmitted from a transmitter to a receiver, which is located in the same cell as the transmitter. This method comprises controlling the output power of the transmitter in dependence on a parameter, that is characteristic of the distance between transmitter and receiver, to approximately follow, from a predetermined maximum output power that is transmitted when the distance between the transmitter and receiver is the maximum within the cell, a first function that monotonically decreases with decreasing distance and approaches a predetermined minimum output power as the distance approaches zero, so that the power of the transmitted radio signals as received by the receiver from a minimum received power, that is received when the distance between transmitter and receiver is the maximum within the cell, approximately follows a second function that monotonically increases with decreasing distance and approaches a maximum received power as the distance approaches zero.

The transmitter can comprise either a mobile station in the current cell or the base station of the same cell.

SHORT DESCRIPTION OF DRAWINGS

The invention, further objects and advantages obtained by the invention are best understood by reference to the following description and the accompanying drawings, in which.

PREFERRED EMBODIMENT

Figure 1:
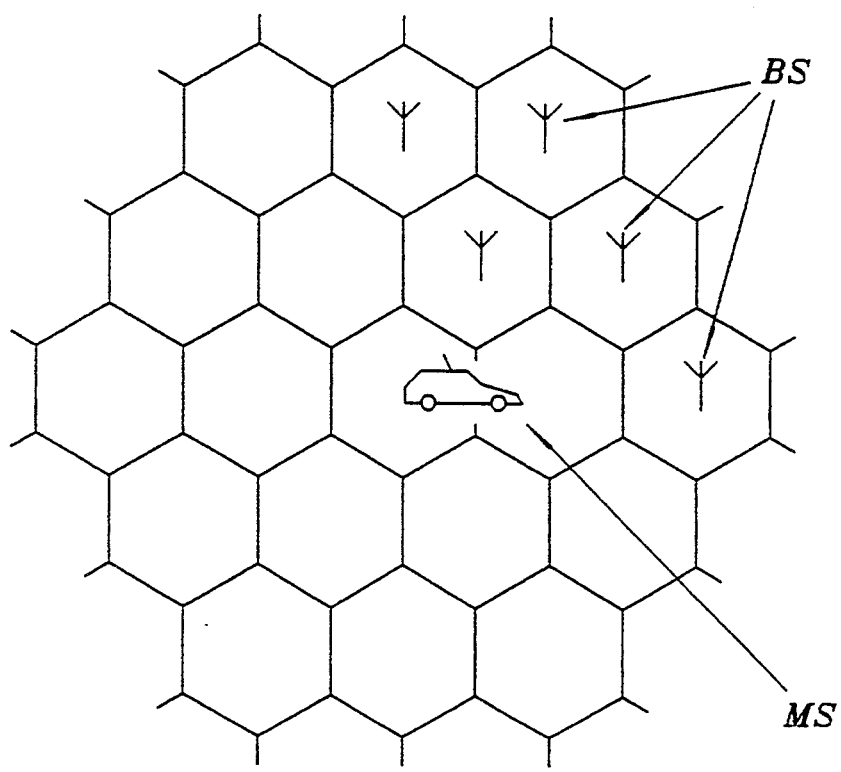
FIG. 1 shows a cellular mobile telephone system.

FIG. 1 shows, as an example of a mobile radio communication system, the structure of an embodiment of a cellular mobile telephone system. Such a system comprises a number of cells, each cell in this embodiment including one base station BS. For reasons of simplicity only a number of such base stations BS are shown in the figure. Base stations BS are in radio contact with a number of mobile stations MS, of which only one is shown in the figure. Mobile station MS generally communicates with the base station BS of that cell in which it currently is located.

Figure 2:
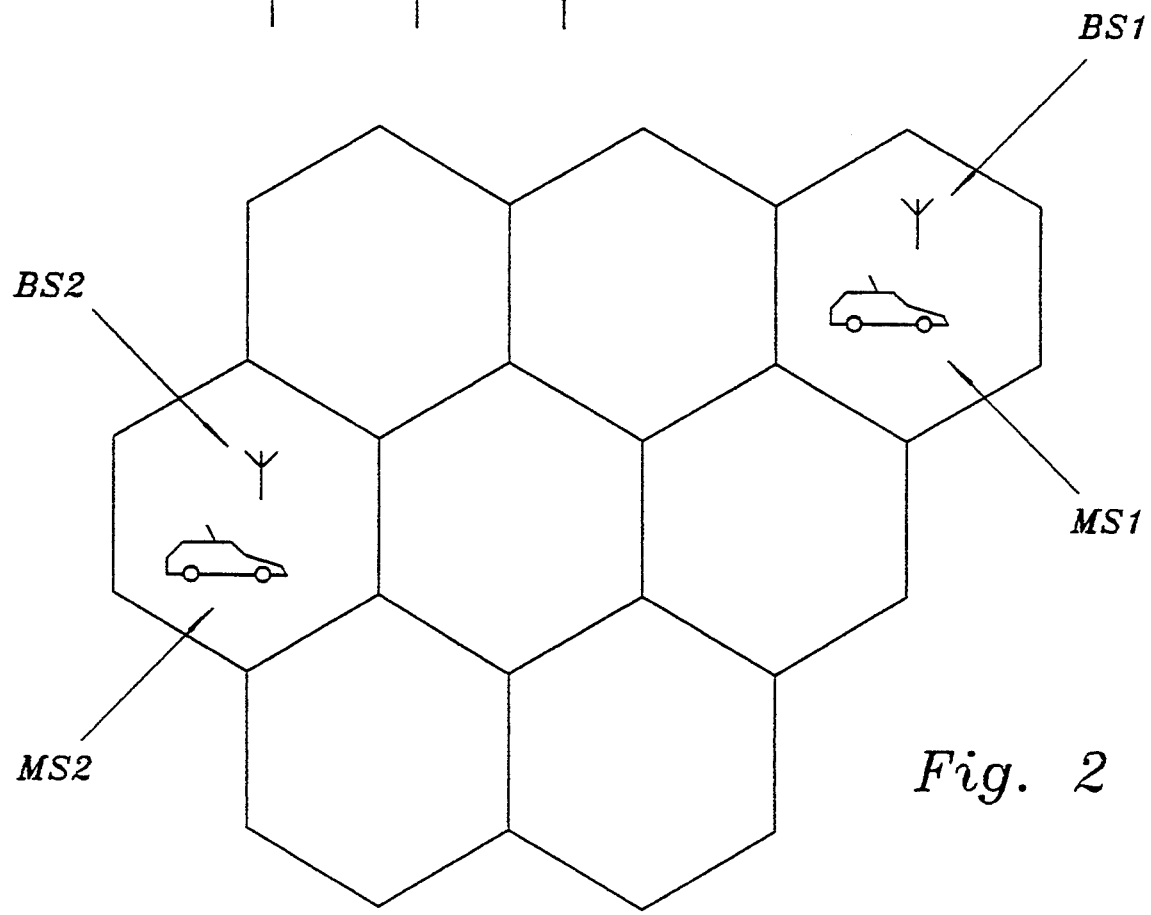
FIG. 2 shows a number of cells in this cellular mobile telephone system of which two use for instance the same radio frequency or radio channel.

FIG. 2 shows a number of cells in a cellular mobile telephone system. A mobile MS1 is in radio contact with base station BS1 in a first cell. In the second cell, separated from the first cell, there is another mobile MS2 in radio contact with base station BS2. If the load on the radio communication system is heavy and the distance between the first and the second cell is sufficiently large, both radio connections may use the same communication channel, for instance the same radio frequency or time slots for the same radio frequency. However, this implies that the output power transmitted from the base stations to the respective mobile stations should be sufficiently low to avoid interference between the cells. On the other hand, the power can not be too low, since this would jeopardize the radio connection between the respective mobile and base station.

Figure 3:
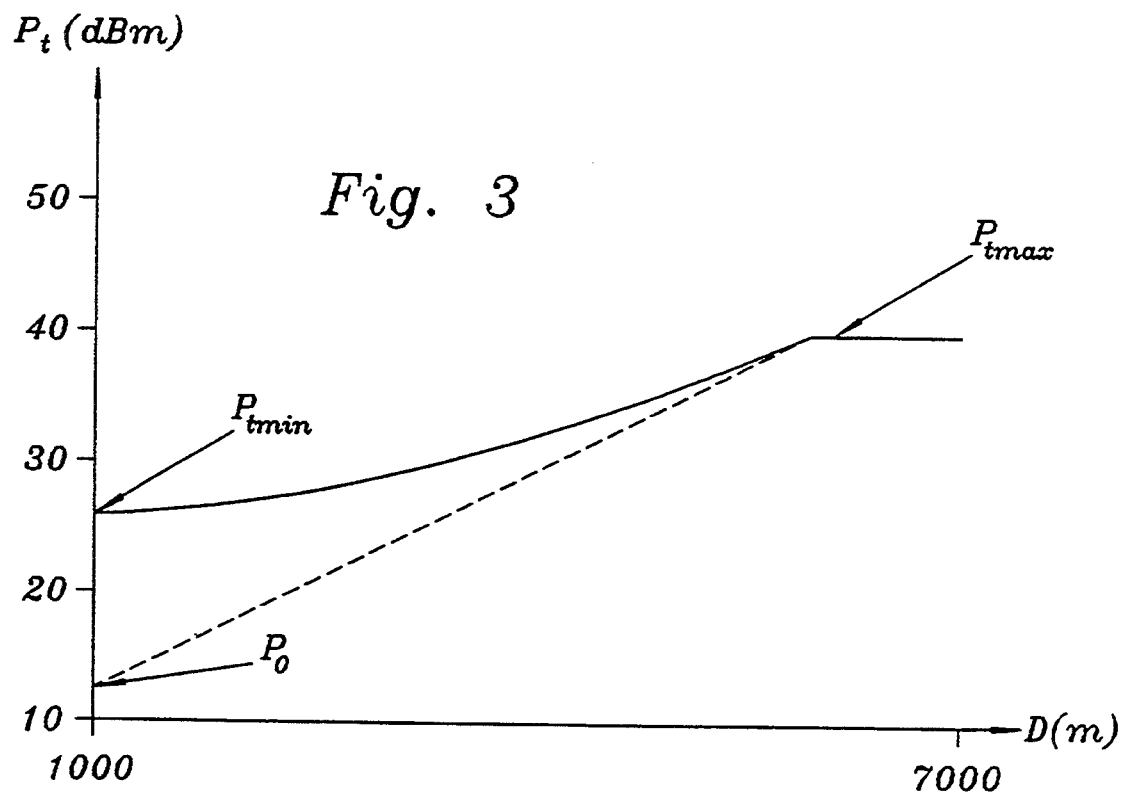
FIG. 3 shows the output power $P_t$ of the radio signal transmitted from a mobile station as a function of the distance D between mobile station and base station in the method in accordance with the present invention.
Figure 4:
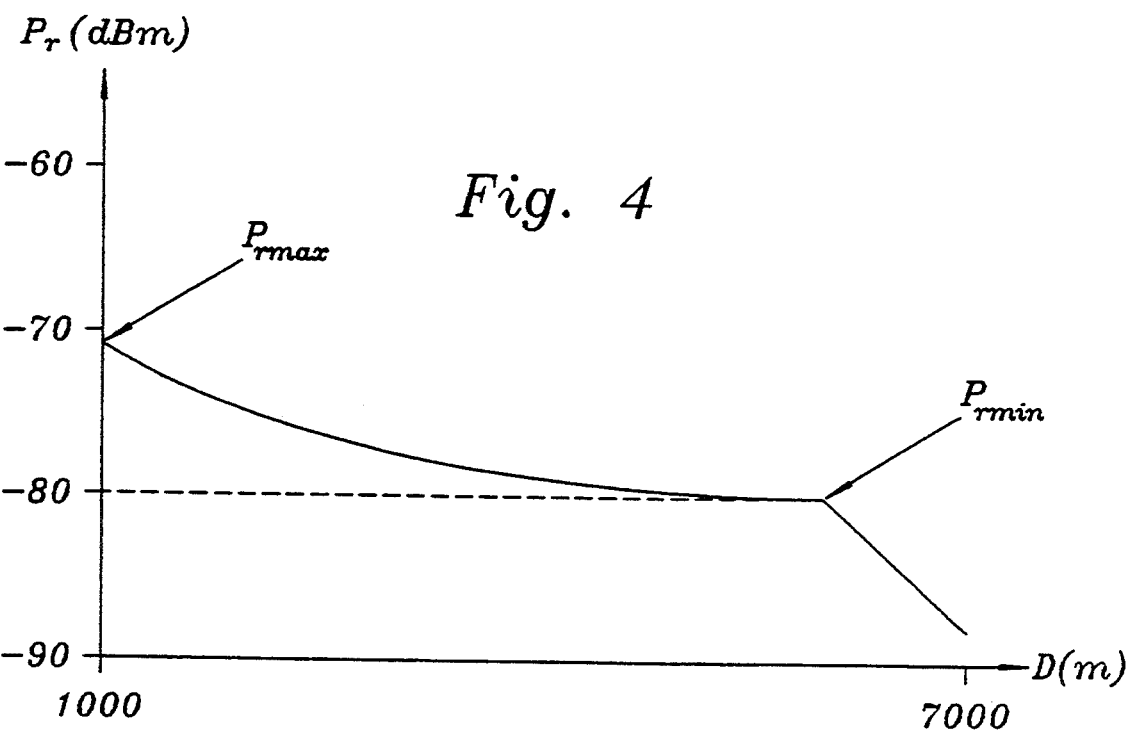
FIG. 4 shows the power $P_r$ of the radio signal received by the base station as a function of the distance D between mobile station and base station when the output power of the radio signal transmitted by the mobile station is controlled in accordance with the curve in FIG. 3.

FIGS. 3 and 4 show transmitted and received power, respectively, as functions of the distance D between mobile station and base station, on the one hand, for the control method in accordance with the above U.S. Pat. No. 4,785,486 (dashed curves) and, on the other hand, for the method in accordance with the present invention (solid curves). In the following description it is assumed that $P_t$(FIG. 3) is the power transmitted by the mobile station and that $P_r$ (FIG. 4) is the power received by the base station. However, this assumption is made only to facilitate the description. $P_t$ could instead represent the power transmitted by the base station. $P_r$ would then represent the power received by the mobile station.

As is apparent from the dashed curve in FIG. 4 the power $P_t$ transmitted by the mobile station in accordance with the previously known method is controlled from the base station in such a way that the power $P_r$ received by the base station is maintained as constant as possible irrespective of where the mobile station is located within the current cell. Thus, $P_r$ in this case essentially has no variation; the dynamic range is zero. Controlling transmission power in this way leads to he power transmitted from the mobile station (measured in dBm) from a minimum output power $P_o$ will vary linearly with the logarithm of the distance between mobile station and base station up to a maximum output power $P_{tmax}$ at the outer regions of the cell, in accordance with the dashed curve in FIG. 3. Thus, $P_t$ in this case has the dynamic range $P_{tmax}-P_o$.

At small distances between the mobile station and its own base station, this control method, however, leads to a reduction in the power $P_t$ transmitted by the mobile station even when the power level already is so low that the risk of disturbing remote base stations is practically negligable. The reason for this is that the control method assumes that the received power $P_r$ also should be constant in this region. Therefore the known method leads to a relatively large dynamic range of the transmitted signal, while the received signal is essentially constant.

The present invention is based on the insight that a better utilization of the radio connection can be obtained by distributing the variation (dynamic range) between the transmitted signal and the received signal. An example of the control method in accordance with the invention is shown by the solid curves in FIGS. 3 and 4. In accordance with the invention the transmitted power $P_t$ is not controlled on the basis of a constant received power that is independent of the distance, rather the transmitted power $P_t$ is controlled to follow a function that monotonically decreases with the distance between mobile station and base station from a maximum value $P_{tmax}$, that is appropriate when the mobile station is located at the outer regions of the cell, and for instance asymptotically approaches a minimum value $P_{tmin}$ as the distance approaches zero. The dynamic range for $P_t$ in this case is only $P_{tmax}-P_{tmin}$. Such a control method results in the solid curve in FIG. 4 for the received power $P_r$. It should be noted that the received signal power in this case steadily increases from a value $P_{rmin}$ to a value $P_{rmax}$ as the distance between mobile station and base station decreases within the cell. The dynamic range for the received signal in this case is $P_{rmax}-P_{rmin}$. By this distribution of the variation in the radio connection such that both the transmitted and received signals have varying power within the cell, C/I of the connection is improved without increasing the risk of interference with other cells that use the same radio channel.

As an example of a suitable controlled curve the function:

$$P_t(D) = \min(P(D), P_{tmax})$$

can be mentioned, where the function P(D) is given by:

$$P(D) = P_{tmin} 10 \log (D^{mp} + D_L^{(m-n)p} \cdot D^{np})^{1/p}$$

In these formulas:
D designates the distance between mobile station and base station;
$D_L$ designates a characteristic distance that defines the location of the "knee" of the curve;
p designates a parameter that controls how smooth the transition between the flattened and steeper parts of the curve is (a large p results in a sharp transition);
n,m designate further parameters that control the shape of the curve.
Exemplifying values for the different parameters are:
$D_L = 2000$ m
p = 3
m = 0
n = 2.8
$P_{tmax} = 38$ dBm
$P_{tmin} = 28$ dBm In practice the control method is not realized with a continuous function, but with stepped functions that approximate this continuous function. A suitable number of levels for such stepped functions has proven to be about ten levels. The value of a stepped function for a given distance D can then easily be obtained from a table.

Figure 5A:
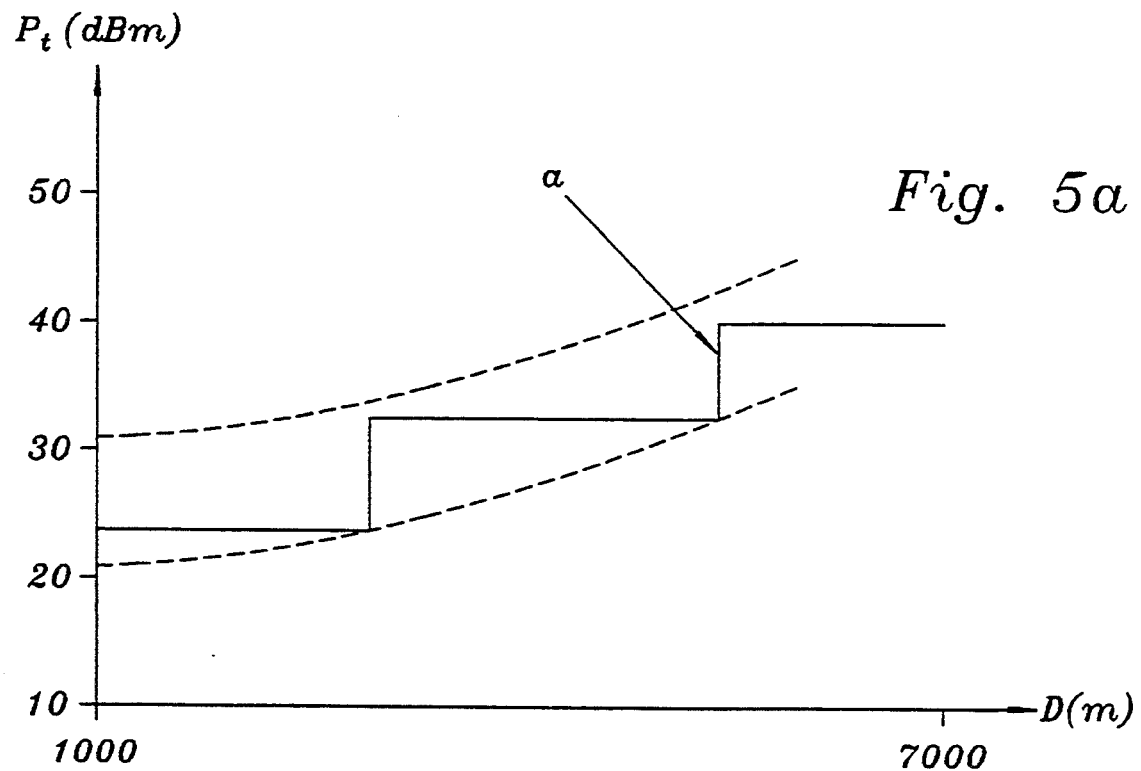
FIGS. 5(a) and 5(b) illustrates a preferred embodiment of the method in accordance with the present invention.
Figure 5B:
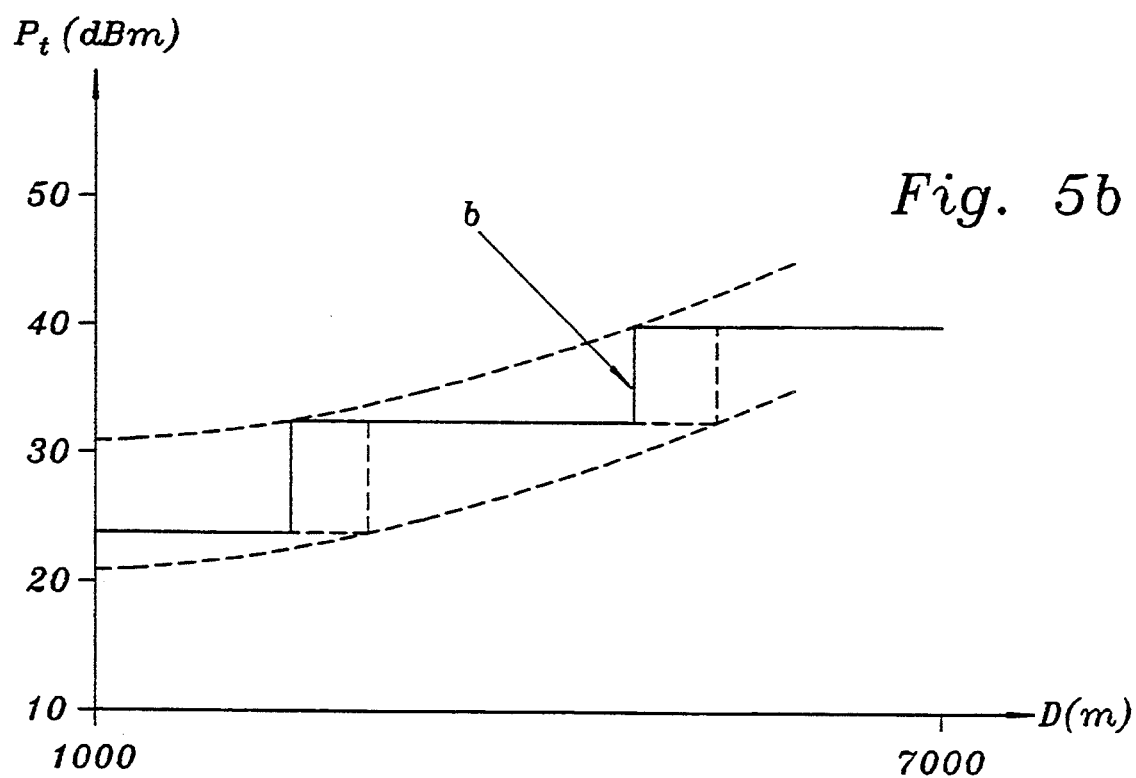

FIGS. 5a and 5b illustrate a preferred embodiment of the method in accordance with the present invention. The stepped functions a and b shown in FIGS. 5a–b for sake of clearness comprise only a few levels. FIG. 5a shows a step function a that approximates the solid control curve of FIG. 3 and that is appropriate when the mobile station leaves the base station. Correspondingly, FIG. 5b shows a stepped function b that approximates the solid control curve of FIG. 3 and that is appropriate when the mobile station approaches the base station. The stepped function a shown in 5a has been dashed in FIG. 5b. From FIG. 5b it is noted that the functions a and b have the same levels, but that the steps are mutually displaced along the distance axes. This results in a certain "hysteresis effect", which will be further described below when the control method in accordance with the preferred embodiment of the invention is described.

The control method is realized in the following way:
At each measurement instance the new measured distance is compared to the previous distance.
If the new distance is larger than the previous distance, an adjustment is to be performed in accordance with stepped function a and therefore the new desired value for the output power $P_t$ is retrieved from the corresponding table for function a.
If the new distance is smaller than the previous distance, an adjustment is to be performed in accordance with stepped function b and therefore the new desired value for the output power $P_t$ is retrieved from the corresponding table for function b.

The result of this control method in accordance with the preferred embodiment is that if the mobile station happens to be near a step and alternately exceeds and underpasses, respectively, this step distance, a jumping desired value is avoided. This is due to the fact that a transition from for instance a distance that is larger than the step distance to a distance that is smaller than this distance also leads to a change of step function from a to b. However, the new step function b has a smaller step distance than the previous function. Therefore a larger distance reduction is required before the desired value is reduced. This feature can be considered as a sort of "hysteresis effect".

The regulation described above is commanded by the base station, and the required calculations can be performed either in the base station or its control unit or even in the mobile services switching center to which the base station is connected.

In the above description the control method has been described as a function of the distance between mobile station and base station in the current cell. However, normally the exact distance is not known, which means that in practice a measure of or a parameter that depends on this distance is used. An example of such a measure is:

The path loss between mobile station and base station. Since the base station over the control channel continuously commands the mobile station to transmit with a certain output power, this commanded output power can be compared to the actually received power. From this information the damping of the signal along the path between mobile station and base station can be calculated. This path loss is then an approximate measure of the distance between the two stations.

The time delay between mobile station and base station for transmitted and received radio signal. Since the mobile station transmits information at predetermined moments, which are controlled by the base station, the time delay between these moments and the actual moments of receipt can be used for calculating an approximate measure of the distance between mobile station and base station.

As has been mentioned above it is also possible to control the output power from the base station in accordance with the described principles. However, the control curve $P_t$ does not have to be identical to the corresponding curve for a mobile station. For instance the curve can have other maximum and minimum values and/or another "knee point". However the general shape of the curve is the same in both cases.

The man skilled in the art appreciates that different changes and modifications of the invention are possible without departure from the scope of the invention, which is defined by the attached patent claims.

We claim:

1. In a cellular mobile radio communications system, a method of controlling the output power of radio signals transmitted from a transmitter to a receiver, wherein said output power of said transmitter is controlled in dependence on a parameter, said parameter being a function of distance between said transmitter and said receiver wherein said output power of said transmitter is proportional to said distance between said transmitter and said receiver and approaches a predetermined minimum output power as said distance approaches zero and received power from said transmitter is inversely proportional to said distance between said transmitter and said receiver when said distance approaches zero.

2. The method of claim 1, wherein said transmitter is in a mobile station.

3. The method of claim 2, wherein said transmitter is controlled by a base station in a same cell as said mobile station.

4. The method of claim 1, wherein said transmitter is in a base station.

5. The method of claim 4, wherein said transmitter is controlled by said base station.

6. The method of claim 1, wherein said parameter comprises the path loss between said transmitter and said receiver.

7. The method of claim 1, wherein said parameter comprises the time delay of said radio signals transmitted and received between said transmitter and said receiver.

8. The method of claim 1, wherein said received power from said transmitter monotonically increases with decreasing distance between said transmitter and said receiver when said distance approaches zero.

9. The method of claim 1, wherein said received power from said transmitter monotonically increases with decreasing distance between said transmitter and said receiver when said distance approaches zero, said received power approaching a maximum received power as said distance substantially reaches zero.

10. The method of claim 1, wherein said output power of said transmitter monotonically decreases with decreasing distance between said transmitter and said receiver and approaches said predetermined minimum output power as said distance decreases to zero.

11. The method of claim 10, wherein said monotonically decreasing output power is approximated by a first and a second step function, each having a predetermined number of discrete power output levels, said first step function being appropriate for increasing distances and said second step function being appropriate for decreasing distances.

12. The method of claim 11, wherein each of said step functions have ten discrete levels.

13. The method of claim 11, wherein said first and second step functions have substantially similar power output levels but have transitions from one level to the next located at different distances, depending on whether the distance between said receiver and said transmitter is increasing or decreasing.

14. The method of claim 13, wherein each of said step functions have ten discrete levels.

* * * * *